Dec. 20, 1927.
C. J. TRUNCK
1,653,072
MECHANICAL SHIFTING MEANS FOR SPEED TRANSMISSION MECHANISM
Filed Feb. 12, 1927　　3 Sheets-Sheet 1
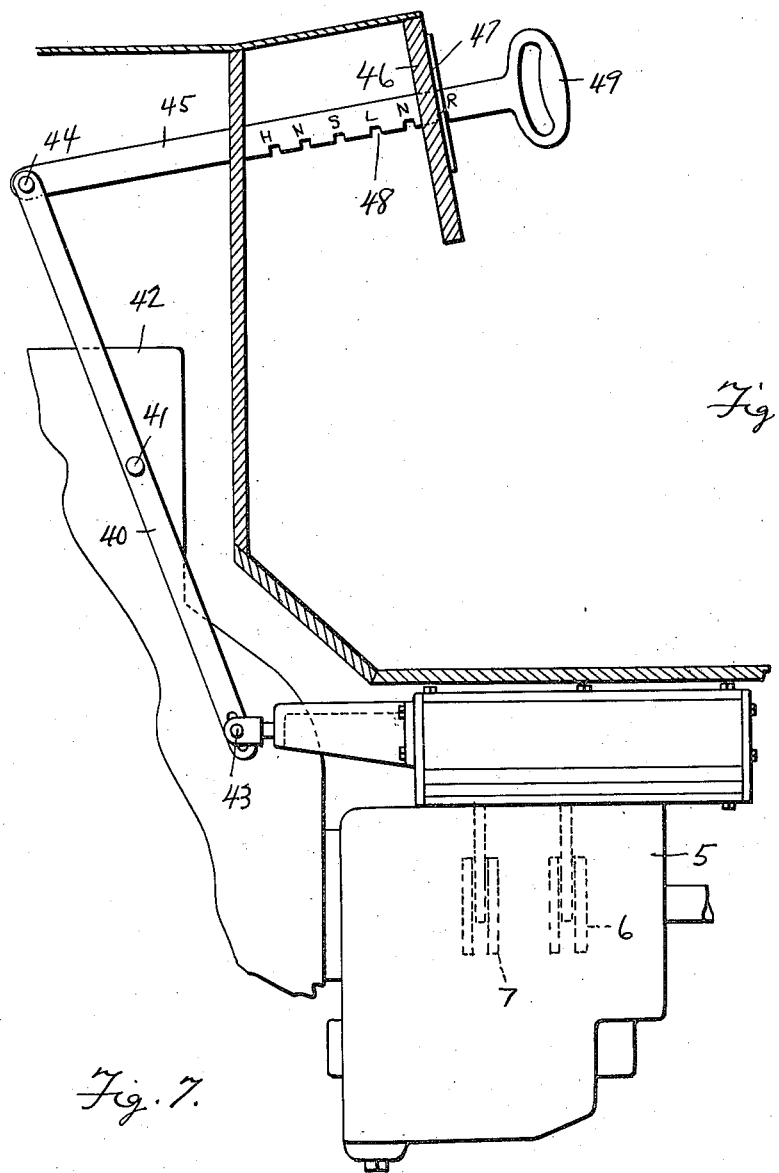
Fig. 1.
Fig. 7.
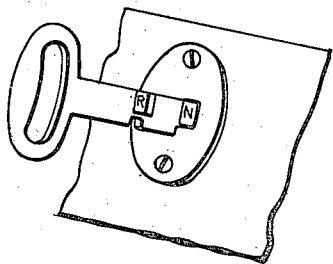
Inventor
Clyde J. Trunck
By Clarence AO'Brien
Attorney Dec. 20, 1927.
C. J. TRUNCK
1,653,072
MECHANICAL SHIFTING MEANS FOR SPEED TRANSMISSION MECHANISM
Filed Feb. 12, 1927   3 Sheets-Sheet 2
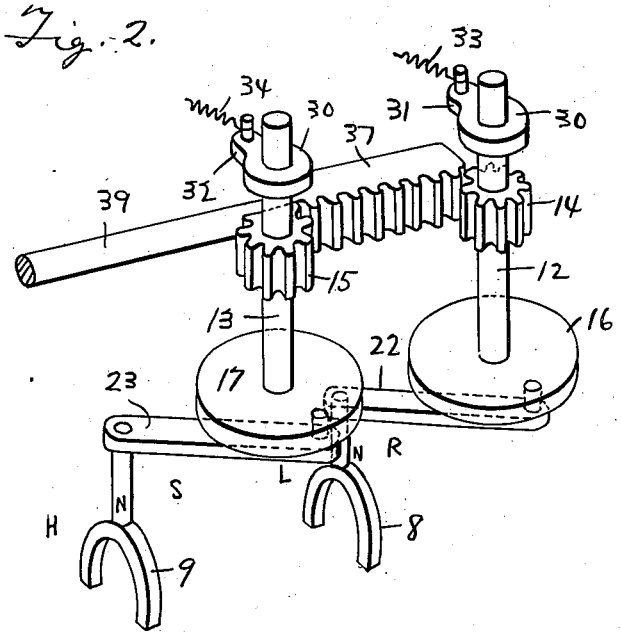
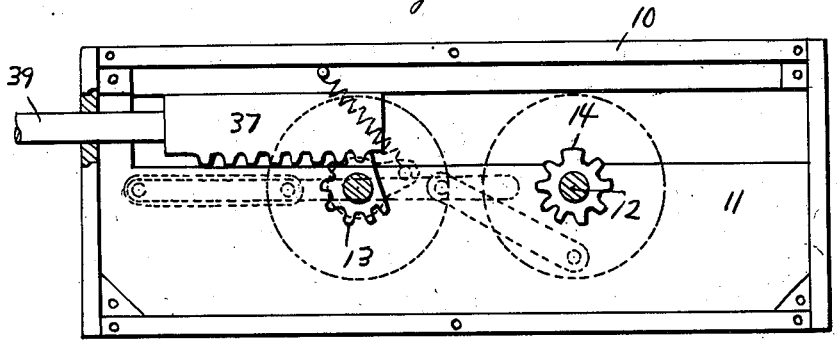
Inventor
Clyde J. Trunck
By Clarence A O'Brien
Attorney Dec. 20, 1927.　　　　　　　　　　　　　　　1,653,072
C. J. TRUNCK
MECHANICAL SHIFTING MEANS FOR SPEED TRANSMISSION MECHANISM
Filed Feb. 12, 1927　　　3 Sheets-Sheet 3
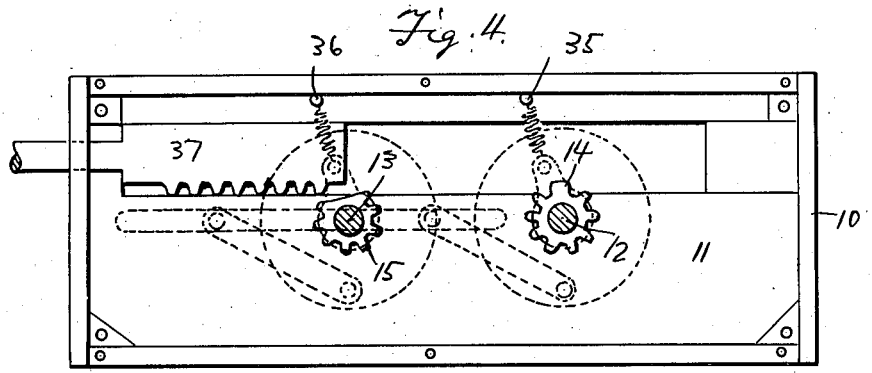
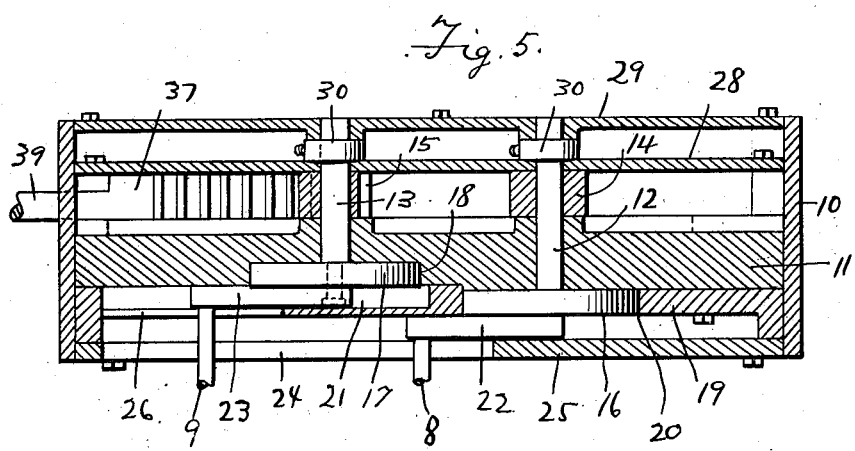
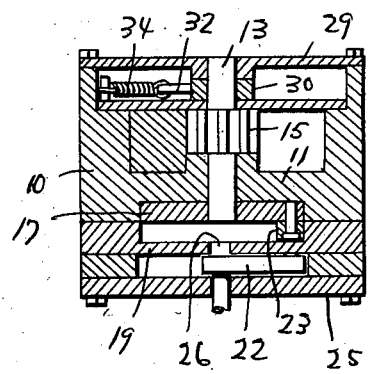
Inventor
Clyde J. Trunck
By *Clarence A. O'Brien*
Attorney Patented Dec. 20, 1927.

1,653,072

UNITED STATES PATENT OFFICE.

CLYDE J. TRUNCK, OF EATON, OHIO.

MECHANICAL SHIFTING MEANS FOR SPEED-TRANSMISSION MECHANISM.

Application filed February 12, 1927. Serial No. 167,762.

The present invention relates to improvements in devices for changing the positions of gears in transmission mechanisms and it has special reference to gear selecting and shifting devices for effecting the gear shifting operations of such speed transmission mechanisms as are adapted for use on automobiles.

A very important object of the invention lies in the provision of a mechanism of this nature for use in connection with a transmission of a motor vehicle whereby the gears of the transmission may be thrown into and out of operation from a point adjacent the instrument board of the vehicle, thereby eliminating the use of a shifting lever which usually extends through the flare-board of the car.

Another important object of the invention is to provide a device of this character to facilitate the operation of the gears with a minimum amount of exertion on the part of the operator.

A still further very important object of the invention lies in the provision of a device of this nature which is exceedingly simple in its construction, easy to manipulate, thoroughly efficient and reliable in its operation, compact, not likely to easily become out of order, and otherwise well adapted to the purpose for which it is designed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit or scope of the invention.

In the drawing:—

Figure 1 is a side elevation of the gear-shifting mechanism embodying the features of my invention showing the same in conjunction with portions of the automobile body shown in section and the transmission thereof shown in elevation, Fig. 2 is a perspective view of the gearing forming a part of the invention, Fig. 3 is a top plan view of the mechanism showing the cover plate and the compartment plate immediately there-below removed, Fig. 4 is a similar view showing the parts in different positions, Fig. 5 is a vertical longitudinal section through the mechanism, Fig. 6 is a transverse vertical section therethrough, Fig. 7 is a detail perspective view showing the handle and the plate associated therewith.

Referring to the drawing in detail it will be seen that the numeral 5 denotes a transmission of any well known type including the usual grooved shifting collars 6 and 7. As is well known the collar 6 may be shifted rearwardly for reverse speed and forwardly for low speed while the collar 7 may be shifted rearwardly for second speed and forwardly for high speed. Both of these collars are indicated in their neutral position. Forks 8 and 9 are associated with collars 6 and 7 respectively taking the place of the usual means. The numeral 10 denotes a casing having a partition 11 mounted therein to form an upper compartment and a lower compartment. Shafts 12 and 13 are journaled in the partition 11. A gear 14 is fixed to the shaft 12 in the upper compartment while a mutilated gear 15 is fixed to the shaft 13 in said upper compartment. A disk 16 is fixed to the shaft 12 in the lower compartment while a disk 17 is fixed to the shaft 13 in the lower compartment being at a slightly higher level than the disk 16 but being disposed in the recess 18 formed in the under surface of the partition 11. A spacing sheet 19 is attached to the under surface of the partition 11 and has an opening 20 for receiving the disk 16 and is formed with a recess 21 in its upper surface adjacent the disk 17. Pitmen 22 and 23 are eccentrically connected with the disks 16 and 17 respectively and have the shanks of forks 8 and 9 engaged therewith respectively. These shanks of the forks 8 and 9 extend through a slot 24 in the lower plate 25 of the casing 10. The shank of the fork 9 also extends through a slot 26 formed in the spacing 19. These slots 24 and 26 permit the forks to travel rectilinearly upon the rotation of the shafts 12 and 13 as will be readily appreciated from an inspection of the drawing. A plate 28 is fixed in the upper portion of the housing 10 immediately above the gears 14 and 15 and has the shafts 12 and 13 journaled therethrough. A cover plate 29 is fixed to the housing and the upper ends of the shafts 12 and 13 are journaled therein and collars 30 are fixed on said shafts to be disposed between the cover plate 27 and the plate 28. These collars 30 have crank arms 32 and 31 extending therefrom to which are engaged springs 33 and 34 respectively which are engaged in the housing 10 by suitable anchoring means as at 35 and 36. A rack bar 37 is slidable in the upper compartment between plates 28 and partition 11 and is formed with a shank 39 slidable through one end wall of the housing. The springs 33 and 34 normally hold the shafts 12 and 13 with the gears 14 and 15 in the position shown in Fig. 2, that is, neutral position. When in this position it will be seen that by pushing the rack bar 37 inwardly it will mesh with the gear 14 and rotate the disk 16 so as to move the fork 18 forwardly and place the transmission in low speed. A further pushing in of the rack bar 37 will cause the further rotation of the disk 16 in the same direction to move the fork 8 into neutral position and then into reverse position as will be quite apparent. By moving the rack 37 forwardly or in the opposite direction from that just mentioned it may be brought back to the position shown in Figure 2 and the spring 33 will maintain the fork 8 in its neutral position through the intermediacy of the crank 31, shaft 12 and disk 16 as will be quite apparent. Now if the rack bar 37 is moved forwardly from the position shown in Fig. 2, it will mesh with the teeth of the mutilated gear 15 to rotate shaft 13 and disk 17 so as to move the fork 9 rearwardly into second speed position. Now a further pulling out of the rack bar 37 in a forward direction will cause the movement of the fork 9 back to neutral and then into high speed position. Now if the rack bar 37 is moved to its forwardmost position as is shown in Fig. 4 it will be seen that it will unmesh with the mutilated gear and may be pushed inwardly or rearwardly freely without operating the gear 15 as it will be seen that it will be disposed in the neutral effecting position because of spring 34 through the parts previously indicated. It will be noted that the spring 34 holds the gear 15 in the position shown to advantage in Fig. 4 so that whenever the rack bar 37 is moved by the gear to the left of this figure it will engage the teeth of the mutilated gear but when moved to the right of this figure it will ratchet thereover.

The numeral 40 denotes a lever pivoted intermediate its ends as at 41 on the engine block 42 or in any other suitable manner and is pivotally engaged as at 43 in any suitable manner with the outer end of the shank 39. The upper end of the lever 40 is pivotally engaged as at 44 with a rod 45 slidable through the dash board 46 on which is disposed a plate 47 having an opening therein the lower edge of which is adapted to engage a plurality of notches 48 corresponding to different positions of the gear shifting mechanism. A handle 49 is formed on the rear end of the rod 45. It is thought that the construction, operation, and advantages of this invention will now be apparent to those skilled in the art. It will be seen that the transmission housing is suitably mounted on top of the usual transmission mechanism 5 by any suitable bolt or in any other suitable manner. This eliminates the necessity of using the usual gear shift 11. The speed gears may be manipulated in an easy and convenient manner from adjacent the dash board.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A gear shifting mechanism for motor vehicles, comprising in combination with the gear shifting members of the transmission, a housing, forks slidably mounted in the housing and having engagement with the gear shifting members, shafts journaled in the housing, means operatively connecting the shafts with the forks to impart rectilinear motion thereto, a gear on one shaft, a mutilated gear on the other shaft, means for holding the shafts in predetermined position normally, and a rack bar slidably mounted in the housing for engaging the gear and the mutilated gear.

2. A gear shifting mechanism for motor vehicles, comprising in combination, with the gear shifting members of the transmission, a housing, forks slidably mounted in the housing and having engagement with the gear shifting members, shafts journaled in the housing, means operatively connecting the shafts with the forks to impart rectilinear motion thereto, a gear on one shaft, a mutilated gear on the other shaft, means for holding the shafts in predetermined position normally, and a rack bar slidably mounted in the housing for engaging the gear and the mutilated gear, and means for shifting the rack bar into different positions.

3. A gear shifting mechanism for motor vehicles, comprising in combination, with the gear shifting members of the transmission, a housing, forks slidably mounted in the housing and having engagement with the gear shifting members, shafts journaled in the housing, means operatively connecting the shafts with the forks to impart rectilinear motion thereto, a gear on one shaft, a mutilated gear on the other shaft, means for holding the shafts in predetermined position normally, and a rack bar slidably mounted in the housing for engaging the gear and the mutilated gear, and means for shifting the rack bar into different positions, said last mentioned means including a lever, means for hingedly mounting the lever intermediate its ends, means for engaging one end of the lever with the rack bar, a rod, notches in the rod, a plate with an opening through which the rod is slidable so that the bottom edge of the opening engages with the notches of the rod and a handle on the end of the rod.

In testimony whereof I affix my signature.

CLYDE J. TRUNCK.